July 11, 1972  W. H. BACH  3,676,221
STACKED BATTERY CONSTRUCTION HAVING INSULATING DISKS
BETWEEN CELLS JOINED BY WELDS
Filed Sept. 23, 1968

INVENTOR.
WALTER H. BACH
BY Bulwider, Patton, Rieber
Lee, and Utecht
ATTORNEYS

United States Patent Office 3,676,221
Patented July 11, 1972

3,676,221
STACKED BATTERY CONSTRUCTION HAVING INSULATING DISKS BETWEEN CELLS JOINED BY WELDS
Walter H. Bach, 6950 Romaine St., Los Angeles, Calif. 90038
Filed Sept. 23, 1968, Ser. No. 761,532
Int. Cl. H01m 21/00
U.S. Cl. 136—111                                    10 Claims

ABSTRACT OF THE DISCLOSURE

A battery comprising a plurality of stacked, disk-like sealed cells secured together by cups fitted over one cell of each pair and having bottoms spot-welded to the next cell and sidewalls spot-welded to the interfitting cell. A heat-shrunk sheath encloses the battery and has caps forming the poles. Between each pair of cells is a circular disk of insulating material against which the cup bottoms bulge upon expansion of the contents of the cells, thereby breaking the welds and electrically disconnecting the cells.

BACKGROUND OF THE INVENTION

This invention relates to a battery construction, and particularly to batteries comprising a plurality of stacked cells having contents that are subject to expansion upon the occurrence of certain conditions such as over-loading or short-circuiting. One such cell is the mercury cell which delivers an output voltage by means of a chemical reaction between zinc and mercury oxide, and typically is in the form of a small sealed disk of narrow axial width having end walls forming contact surfaces for conducting engagement with the end walls of adjacent cells when a plurality of such cells are stacked coaxially and secured together to form a battery.

When a cell is over-loaded or short-circuited, the chemical reaction inside the cell causes expansion of the contents. Such expansion can rupture the case of the cell, and in some instances the rupturing is so violent as to constitute an explosion.

SUMMARY OF THE INVENTION

The primary object of the present invention is to eliminate the danger of such explosions by electrically disconnecting the cells automatically in response to sensed swelling or bulging of a cell, and to accomplish this end in a relatively simple and inexpensive manner with disabling elements disposed between the cells and activated automatically in response to bulging of an adjacent cell wall. More specifically, an insulating spacer is disposed between each pair of cells, and the adjacent contact walls are joined together around or across the spacer by a frangible joint such as a series of spot-welds that will break and disconnect the walls when one of the walls bulges against the spacer.

Other objects and advantages of the invention will become apparent from the following detailed description, taken in conjunction with the accompanying drawings.

DETAILED DECRIPTION

Figure 1:
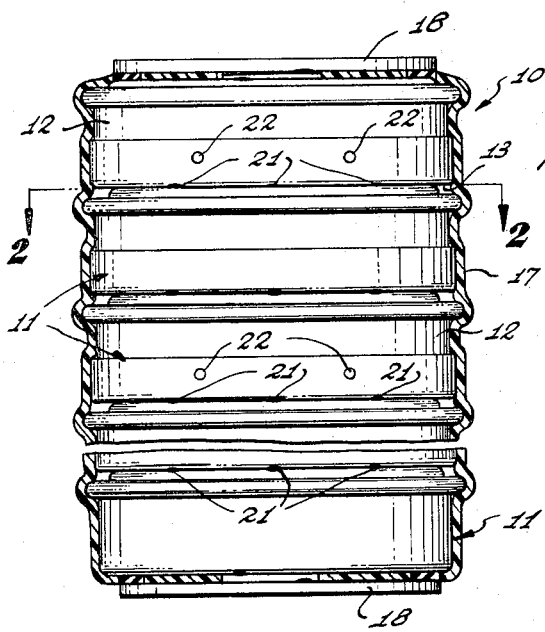
FIG. 1 is a side elevational view of a battery embodying the novel features of the present invention and including a sheath holding a plurality of cells in a stack, the sheath being shown in cross-section.

As shown in the drawings for the purpose of illustration, the invention is embodied in a battery 10 formed by a stack of series-connected mercury cells 11 of a well-known type having chemical contents (not shown) producing a voltage differential between the opposite end surfaces of each cell. Each cell is generally disk-shaped and has a cylindrical sidewall 12, a generally flat circular wall 13 (FIG. 4) forming the lower end of the disk as viewed in the drawings, and a circular upper end wall 14 fitted tightly into the sidewall and sealed therein by a suitable compound shown at 15 in FIGS. 2 and 5.

At least two, and usually more than two, such cells 11 are stacked coaxially to form the battery 10, four cells being shown herein. To secure the cells together in the stack, each pair of cells is joined together in a suitable manner, such as spot-welding of the adjacent contact surfaces together, and herein the stack is encased in a plastic sheath 17 fitted snugly around the stack with a shrink fit. Metal caps 18 at the ends of the stack close the ends of the sheath and are electrically connected to the adjacent contact surfaces of the end cells to form the poles of the battery.

To facilitate the welding operation, the lower portion of each cell 11 above the lower end cell is fitted in a cup having a sidewall 19 secured to the cylindrical sidewall 12 of the cell and a bottom 20 secured to the adjacent end of the next cell within the stack. The bottom 20 of each cup thus can be spot-welded to the adjacent lower cell, the next cell fitted in the cup, and the sidewalls 12 and 19 spot-welded together. In this manner, the cup bottoms 20 become extensions of the lower contact walls 13 of the cells. The cells thus are joined electrically by the spot-welds, which are indicated at 21 and are held securely in stacked relation by the sheath 17. The spot-welds between the cup walls 19 and the disk walls 12 are indicated at 22.

In accordance with the present invention, the battery 10 is protected against excessive expansion of the individual cells 11, and thus against rupturing and explosion of the cells, by insulating spacers 23 centrally disposed between the contact walls 14 and 20 of the pairs of cells, thereby to disconnect the spaced portions of the walls electrically from each other. The joint between the contact walls herein formed by the spot-welds 21 is disposed around the spacer and is frangible or breakable in response to an expansion force within a cell great enough to bulge one end wall thereof outwardly against the spacer but insufficient to explode the cell. Thus, the bulging of the central portion of the cell wall against the spacer axially spreads the cells to shift the spot-welded portions away from each other, leaving the bulged central portion in engagement with the insulating spacer and the peripheral portions axially spaced apart.

In this instance, each spacer 23 is a relatively thin, circular disk of suitable material such as that sold under the name "Mylar," and has a diameter equal to about one-fourth the diameter of the contact walls 14 and 20 of the cells and a thickness on the order of 0.010 of an inch. For convenience in assembly and to insure retention of the spacer in the selected central position, it preferably is cemented to one of the end walls, either on the underside of the cup bottom 20 or on top of the upper contact wall 14.

Figure 2:
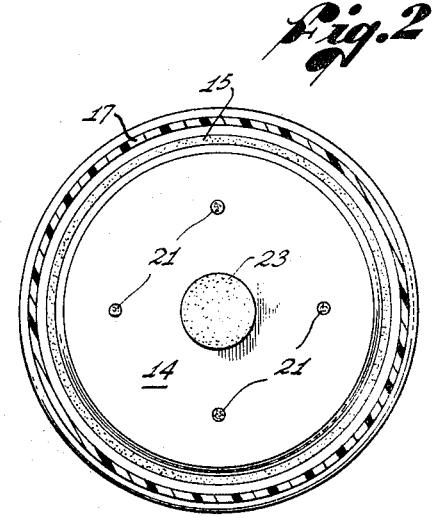
FIG. 2 is a cross-sectional view taken substantially along the line 2—2 of FIG. 1.
Figure 4:
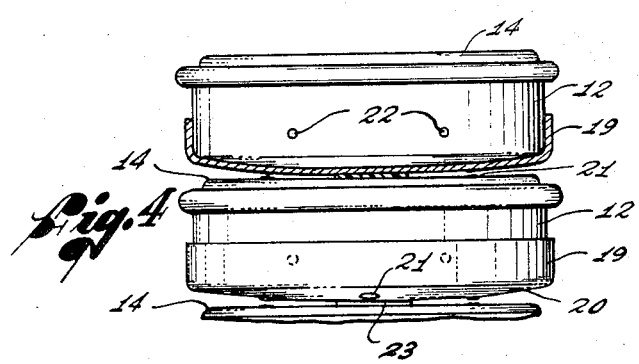
FIG. 4 is a fragmentary elevational view showing part of the stack of cells in FIG. 1, after expansion of contact walls thereof.
Figure 3:
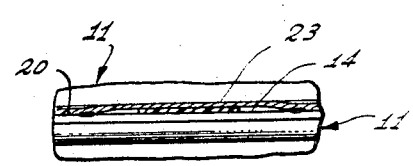
FIG. 3 is an enlarged fragmentary cross-section taken substantially along the line 3—3 of FIG. 1.
Figure 5:
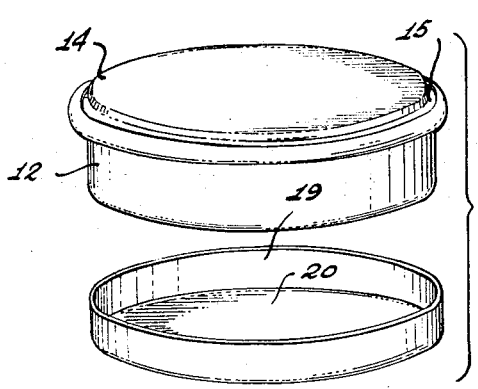
FIG. 5 is an exploded perspective view of one of the cells.

As shown most clearly in FIGS. 2 and 4, the representative frangible joint comprises four spot-welds 21 distributed around the spacer 23 approximately midway between the latter and the periphery of the upper contact wall 14 of the lower cell in the pair. In the illustrative cells, the upper wall is relatively rigid while the lower wall 13 and the cup bottom 20 are more flexible so that the spot-welding operation draws each cup bottom down around the spacer in an inverted, dished configuration (FIG. 3) for conducting contact along a substantially uninterrupted and generally circular line passing through the four welds. The central portions of the contacting end walls, however, are separated by the spacers.

The expanded condition of one of the cells 11 is illustrated in FIG. 4 wherein it will be seen that the lower end wall 13 and the cup bottom 20 have bulged downwardly from the normal condition, the central portion having bulged to a greater extent than the peripheral portion, as would be expected. Thus, the central portion is the primary pressure point through which the expansion acts against the spacer in tending to spread the two cells of the pair, and the result is a breaking and separation of the four spot-welds 21. This leaves the cells in the condition shown, in which the cup bottom 20 is insulated from the adjacent upper contact wall 14 by the spacer in the central portion and by the air gap outside the periphery of the spacer.

Accordingly, there is no conducting contact between the two cells, and the electrical connection is effectively broken to prevent further conduction that could lead to additional expansion and possible rupture of the expanded cell.

From the foregoing, it will be seen that the simple insulating spacers 23 between adjacent cells 11 may be incorporated in a battery 10 without significant expense in labor or materials, and without interfering with normal operation of the battery, but are operable automatically as an incident to the beginning of excessive expansion to disable the battery and avoid possibly serious damage.

It is to be understood that the foregoing is illustrative only and that the invention is not limited thereby but may include various modifications and changes made by those skilled in the art without distinguishing from the scope of the invention as defined in the appended claims.

I claim:

1. In a battery having a stack of disk-shaped cells each having a yieldable end wall for bulging outwardly upon expansion of the contents of the cell, said cells being stacked one upon the other with said yieldable end walls facing in one direction and overlying an end contact wall of the adjacent cell in the stack, and a sleeve telescoped over said stack and surrounding said cells with a tight fit to hold the stack together, the improvement comprising:
    a disk-like insulating wafer centrally disposed between each pair of cells in said stack and separating the central portion of said contact wall of one cell from said yieldable wall of the next cell,
    and frangible spot-welds spaced around said wafer and joining said contact wall to said yieldable wall outside said wafer to connect said cells in series whereby expansion of the contents of one cell causes bulging of said yieldable wall against said wafer to urge the peripheral portion of said yieldable wall away from said next cell and break said spot-welds, thereby electrically disconnecting the cells.

2. A battery as defined in claim 2 in which said cells are mercury cells, and each pair of cells is joined together by a metal cup fitted onto one cell and secured thereto with the bottom of said cup disposed between the cells of said pair and covering said yieldable wall so as to constitute an extension thereof, said spot-welds being formed between said cup bottom and the end contact wall of the other cell of said pair.

3. In a battery having at least two coaxial disk-shaped cells with abutting end walls, at least one of which bulges outwardly upon building up of internal pressure in the cell, and means holding said cells yieldably in stacked abutting relation, the improvement comprising:
    a spacer centrally disposed between each pair of abutting end walls and composed of electrical insulating material, said spacer being relatively thin and substantially smaller than said end walls,
    and a frangible conducting joint between said end walls around said spacer normally electrically connecting said cells, said joint being separable upon bulging of one of said walls against said spacer, thereby to electrically disconnect said cells.

4. A battery as defined in claim 3 in which one of said cells has an end wall formed by the bottom of a cup fitted around and secured to the cell and abutting against the adjacent end wall of the other cell, said spacer being disposed between the central portion of said cup bottom and the adjacent end wall, and said joint comprising at least one weld between said cup bottom and said adjacent end wall.

5. A battery as defined in claim 4 in which said spacer is a thin disk and one of said end walls is centrally dished away from the other around said spacer with said joint joining said end walls together around the dished central area.

6. A battery as defined in claim 4 in which said joint comprises a plurality of spot-welds spaced around said spacer.

7. In a battery having at least two stacked cells with abutting contact surfaces, at least one of which is yieldable outwardly to bulge in a known area upon expansion of the contents of the cell, and means holding said cells yieldably in stacked abutting relation, the improvement comprising:
    a spacer composed of electrical insulating material disposed between said cells and against said known area, and
    a frangible conducting joint between said cells electrically connecting the abutting contact surfaces together and bonding said surfaces around said spacer, the latter being positioned on said yieldable surface to form a pressure point for separation of said cells upon bulging of said yieldable surface thereby to cause breakage and separation of said joint and electrically disconnect said cells on opposite sides of the spacer.

8. A battery as defined in claim 7 including more than two cells and a spacer between each pair of cells for electrically disconnecting any cell in which expansion occurs, each pair of cells having abutting contact surfaces including at least one yieldable surface.

9. A battery as defined in claim 8 in which said cells are disk-shaped and have substantially flat end contact surfaces, said spacers being thin disks centrally located between said surfaces and said joints being disposed around the periphery of said spacers.

10. A battery as defined in claim 9 in which said joint comprises a plurality of spaced spot-welds.

References Cited

UNITED STATES PATENTS

| | | | |
|---|---|---|---|
| 2,666,800 | 1/1954 | Hoynes | 136—110.3 |
| 2,686,214 | 8/1954 | Arbogast | 136—111.7 |
| 2,798,895 | 7/1957 | Nowotny | 136—111 |
| 2,870,235 | 1/1959 | Soltis | 136—111 |
| 2,995,614 | 8/1961 | Krueger | 136—111 |

WINSTON A. DOUGLAS, Primary Examiner

C. F. LEFEVOUR, Assistant Examiner

U.S. Cl. X.R.

136—107